US009915436B1

(12) United States Patent
Feria

(10) Patent No.: US 9,915,436 B1
(45) Date of Patent: Mar. 13, 2018

(54) HEAT SOURCE OPTIMIZATION SYSTEM

(71) Applicant: Ralph Feria, Pickens, SC (US)

(72) Inventor: Ralph Feria, Pickens, SC (US)

( * ) Notice: Subject to any disclaimer, the term of this patent is extended or adjusted under 35 U.S.C. 154(b) by 105 days.

(21) Appl. No.: 15/002,019

(22) Filed: Jan. 20, 2016

Related U.S. Application Data

(60) Provisional application No. 62/105,592, filed on Jan. 20, 2015.

(51) Int. Cl.
| | |
|---|---|
| *F25B 7/00* | (2006.01) |
| *F24D 19/10* | (2006.01) |
| *F25B 27/00* | (2006.01) |
| *F25B 49/02* | (2006.01) |
| *F25B 30/06* | (2006.01) |

(52) U.S. Cl.
CPC .......... *F24D 19/1087* (2013.01); *F25B 27/00* (2013.01); *F25B 30/06* (2013.01); *F25B 49/02* (2013.01)

(58) Field of Classification Search
CPC ............. F25B 7/00; F25B 45/00; Y02B 30/62
USPC ............................................ 62/79, 149, 277
See application file for complete search history.

(56) References Cited

U.S. PATENT DOCUMENTS

| | | | |
|---|---|---|---|
| 3,078,689 A | 2/1963 | Japhet | |
| 3,127,928 A | 4/1964 | Ringquist | |
| 3,305,001 A | 2/1967 | Haufler et al. | |
| 4,391,104 A | 7/1983 | Wendschlag | |
| 4,522,253 A | 6/1985 | Levin | |
| 5,025,634 A * | 6/1991 | Dressler | F24J 3/081 62/160 |
| 5,244,357 A | 9/1993 | Bauer | |
| 6,233,951 B1 | 5/2001 | Cardill | |
| 6,347,527 B1 | 2/2002 | Bailey et al. | |
| 6,609,390 B1 * | 8/2003 | Ueno | F25B 7/00 62/335 |
| 6,688,129 B2 | 2/2004 | Ace | |
| 7,228,696 B2 | 6/2007 | Ambs et al. | |
| 7,640,763 B2 | 1/2010 | Nishimura et al. | |
| 7,827,814 B2 | 11/2010 | Slater | |
| 8,127,566 B2 | 3/2012 | Hammond | |
| 8,161,765 B2 | 4/2012 | Marois | |
| 8,312,734 B2 | 11/2012 | Lewis | |
| 8,468,845 B2 | 6/2013 | Chordia et al. | |
| 2011/0265972 A1 | 11/2011 | Maxwell | |
| 2011/0289953 A1 | 12/2011 | Alston | |
| 2011/0308268 A1 | 12/2011 | Krimsky | |
| 2013/0233509 A1 | 9/2013 | Schultz et al. | |

(Continued)

*Primary Examiner* — Melvin Jones
(74) *Attorney, Agent, or Firm* — Smith Moore Leatherwood LLP; Thomas W. Epting

(57) ABSTRACT

A heat source optimization system capable of alternating configurations between an air exchange system and a geothermal system and/or earth loop systems depending on an instantaneous need and/or desire for taking in or discharging heat, while simultaneously remaining operational and without reversing valving or changing the rotational direction of a refrigerant compressor. The system manages refrigerant, and, via a processor and/or controller system, determines where to obtain refrigerant and also the quantity of refrigerant to be obtained. Additionally, the system, via a processor and/or controller system, both determines the optimal location or locations from which to take in heat or to which heat is to be rejected.

6 Claims, 9 Drawing Sheets

(56) References Cited

U.S. PATENT DOCUMENTS

2013/0299123 A1 11/2013 Matula
2014/0069607 A1 3/2014 Crook

\* cited by examiner

| Mode | Outdoor Coil 128 Mode | Outdoor Fan 156 | Compressor 124 Speed / Variable Capacity | Valves Open | Expansion Valve (EEV) Active | Groundwater / Ground Loop |
|---|---|---|---|---|---|---|
| Simultaneous Heat and Cool (SHC) (FIG. 1A) | Not used | Not used | Control system 400 automatically modulates on cold or hot water temperature set point proximity | SV-1B SV-2B SV-3 | EEV A | Takes heat from, or rejects heat to groundwater / ground loop as optimization requires |
| Heat Only (FIG. 1B) | Evaporator | Modulates on ambient temperature and refrigerant pressure | Control system 400 automatically modulates on hot water temperature set point proximity | SV-1B SV-2A SV-2B 4 | EEV A or EEV B (EEV A - if heat from ground water; EEV B - if heat from air) | Takes heat from groundwater / ground loop when heat from the air is no longer the optimal choice |
| Cool Only (FIG. 1C) | Condenser | Modulates speed on pressure and liquid temperature | Control system 400 automatically modulates on water temperature | SV-1A SV-3 | EEV A | Reject heat to groundwater / ground loop if more efficient |
| Defrost (FIG. 1D) | Changes from evaporator to condenser | Off | Control system 400 automatically modulates depending on the calculated defrost interval | SV-1A SV-3 | EEV A | Takes heat from groundwater / ground loop or chilled water loop to optimize defrost |

*FIG. 4*

HEAT SOURCE OPTIMIZATION SYSTEM

BACKGROUND

The present disclosure relates generally to the field of heat pump systems using a vapor compression cycle, and more specifically to use of such systems in heating, ventilation, air conditioning, refrigeration, fluid heating and chilling.

Various systems are available for heating, ventilation, air conditioning, refrigeration, fluid heating and chilling. Such systems can be dedicated to heating or to cooling, or, for example, in the case of heat pump systems, the direction of a refrigerant flow can be reversed through heat exchangers in forced-air systems to either allow for absorption of heat from a space for the cooling such space or for absorption heat from the outdoors for the heating of such space. In this type of arrangement, forced-air flows over the heat exchanger through ductwork to such space.

Heat pump systems may also be used in ductless systems, including direct expansion systems, where a refrigerant heat exchanger is typically in the space to be heated and/or cooled. Variable refrigerant flow systems are examples of direct expansion systems and may offer benefits in certain applications, including improved energy efficiency. Such systems may use one or more condensing units and provide refrigerant to one or more evaporator units in a ductless manner.

In certain situations, conventional direct expansion systems may involve safety issues in that because one or more of the heat exchangers is in the space being heated and/or cooled, in the event of a refrigerant leak, the refrigerant may leak into such space. Certain refrigerant gas is heavier than air and can displace oxygen in a room or space, and in extreme situations, could displace a sufficient amount of oxygen from a space such that a person could succumb to suffocation. As certain refrigerants cannot generally be detected by a person through sight, smell, or otherwise, the severity of such a refrigerant leak could become grave.

Therefore, there is a need for heating and chilling systems for a fluid, such as water, which provide increased efficiency and which also lessen the risk of injury to persons in the event of a refrigerant leak.

SUMMARY

Accordingly, apparatuses and methods intended to address the above concerns would find utility.

The following is a non-exhaustive list of examples, which may or may not be claimed, of the subject matter according the present disclosure.

One example of the present disclosure relates to a heat source optimization system that may readily change configurations between an air exchange system and a geothermal (ground water) system and/or earth (ground) loop systems depending on an instantaneous need for taking in or discharging heat, while both remaining operational and without reversing valving or changing the rotational direction of a refrigerant compressor.

Another example of the present disclosure relates to a heat source optimization system that manages refrigerant that, via a processor and/or controller system, both determines where to obtain refrigerant and the quantity of refrigerant to be obtained. One or more sensors may be included for providing feedback to the processor and/or controller regarding instantaneous and longer-term operational conditions and constraints.

Another example of the present disclosure relates to a heat source optimization system that, via a processor and/or controller system, both determines the optimal location or locations from which to take in heat or to which heat is to be rejected. For example, if groundwater and/or one or more earth (ground) loops become more optimal than air for a heat source or acting a heat sink, respectively, then the heat source optimization system, while remaining operational, i.e., without shutting down, and without reversing valves or changing the rotational direction of a refrigerant compressor, changes its configuration such that groundwater and/or one or more earth (ground) loops becomes the source into which heat is rejected, or from which heat is received, as the case may be.

In another example of the present disclosure, a heat source optimization system includes a variable speed refrigerant compressor configured to generally run at a speed commensurate with the heating and/or cooling load experienced by such system, substantially nonstop, i.e., 24 hours a day, seven days a week, year-round, speeding up and slowing down as necessary to meet demand. It is to be understood, however, in the event of a prolonged period of no demand, the refrigerant compressor may be configured to shut down.

Yet another example of the present disclosure relates to a heat source optimization system that includes a multiple-speed or variable speed drive having an inverter, which drives a direct current ("DC") variable speed refrigerant compressor. It is to be understood that a multiple-speed or variable speed alternating current ("AC") motor could also be used, if desired. The refrigerant compressor may, in one implementation, be driven at multiple-speeds or at variable speeds and may be a scroll compressor, a screw-type compressor, piston compressor, or rotary compressor. In communication with the variable speed drive is a processor and/or controller. The refrigerant compressor compresses a working, or "primary," fluid, which could be any suitable refrigerant, including without limitation, carbon dioxide, water, a zeotropic (but near-azeotropic mixture of difluoromethane) which could include R410a and/or pentafluoroethane. One or more heat exchangers are provided which allow a "secondary" fluid, such as water, or some other preferably non-toxic refrigerant (which could include a water-glycol mixture), to be heated or cooled in one or more separate open and/or closed loops. In one example, this secondary fluid can then be run through individual heat exchangers within living and working spaces, and one or more fans may be provided for an air flow through such heat exchanger to deliver heating or cooling to such living, working and/or other space. In such hot water loop and cold water loop, the loops can include the secondary fluid. In one example, if potable hot or cold water is desired, one or more separate heat exchangers may be provided to heat and/or cool one or more open loops of water.

Another example implementation of the present disclosure includes a system for heat source optimization using a primary fluid and first secondary fluid and a second secondary fluid, the system comprising a compressor that compresses and outputs the primary fluid to a substantially heated gaseous state, a first heat exchanger that receives the primary fluid output from the compressor and that receives the first secondary fluid and that transfers heat from the primary fluid to the secondary fluid, a subcooler that substantially condenses the primary fluid from the first heat exchanger and outputs the primary fluid in a substantially liquid state, and a receiver that receives the primary fluid from the subcooler and accumulates a portion of primary fluid. At least one valve is provided that selectively controls primary fluid sent to and withdrawn from the receiver. An expansion device is provided that causes the primary fluid to expand to a substantially a gaseous state, and a second heat exchanger: receives the primary fluid output from the expansion device; receives the second secondary fluid; and transfers heat from the second secondary fluid to the primary fluid. An accumulator receives the primary fluid from the second heat exchanger, accumulates liquid portions of the primary fluid, and outputs to the compressor the primary fluid in substantially a gaseous state. Also provided is a processor, at least one sensor coupled to the processor, and a computer-readable storage medium coupled to the processor having computer-readable program code stored therein that, in response to execution by the processor, causes the apparatus real-time during operation of the system to: receive at least one measurement from the sensor, and from the measurement identify or calculate an generally instantaneous quantity of primary fluid required by the system; calculate or determine whether to supply to the system an amount of primary fluid from the receiver; calculate or determine whether to withdraw from the system an amount of primary fluid to be sent to the receiver; and automatically activate the valve to supply to the system primary fluid from the receiver or to withdraw primary fluid from the system and send the withdrawn primary fluid to the receiver.

A further example implementation of the present disclosure includes a system for heat source optimization using a primary fluid and first secondary fluid and a second secondary fluid, the system comprising a ambient air source, a ground source of fluid, a compressor that compresses and outputs the primary fluid to a substantially heated gaseous state, a first heat exchanger that receives the primary fluid output from the compressor and that receives the first secondary fluid and that transfers heat from the primary fluid to the secondary fluid, a subcooler that substantially condenses the primary fluid from the first heat exchanger and outputs the primary fluid in a substantially liquid state, and a receiver that receives the primary fluid from the subcooler and accumulates a portion of primary fluid. At least one valve is provided that selectively controls primary fluid sent to and withdrawn from the receiver. An expansion device is provided that causes the primary fluid to expand to a substantially a gaseous state, and a second heat exchanger receives the primary fluid output from the expansion valve and transfers heat from the second secondary fluid to the primary fluid. An accumulator receives the primary fluid from the second heat exchanger, accumulates liquid portions of the primary fluid, and outputs to the compressor the primary fluid in substantially a gaseous state. Control means selectively supply the first heat exchanger from the ambient air source or the ground source of fluid and selectively supply the second heat exchanger from the ambient air source or the ground source of fluid. Also provided is a processor, at least one sensor coupled to the processor, and a computer-readable storage medium coupled to the processor having computer-readable program code stored therein that, in response to execution by the processor, causes the apparatus real-time during operation of the system to: receive at least one measurement from the sensor, and from the measurement identify or calculate the temperature of the ambient air source; receive at least one measurement from the sensor, and from the measurement identify or calculate the temperature of the ground source of fluid; calculate or determine whether it is advantageous to supply the first heat exchanger from the ambient air source or the ground source of fluid; calculate or determine whether it is advantageous to supply the second heat exchanger from the ambient air source or the ground source of fluid; and automatically activate the control means system to supply the first heat exchanger from the calculated most advantageous of the ambient air source and the ground source of fluid and to supply the second heat exchanger from the calculated most advantageous of the ambient air source and the ground source of fluid.

A still further example of the present disclosure relates to a heat source optimization system, wherein a cold water supply and a cold water return are provided as are also a hot water supply and a hot water return. During a full water heating operation, the two water supplies are used and two water returns are used, and vice versa when the device is dedicated for cooling, i.e., the two water supplies are used for cooling and the other two water returns are used.

BRIEF DESCRIPTION OF THE DRAWINGS

The drawings referenced herein form a part of the specification. Features shown in the drawings are meant as illustrative of some, but not all, examples of the present disclosure, unless otherwise explicitly indicated, and implications to the contrary are otherwise not to be made. Although in the drawings like reference numerals correspond to similar, though not necessarily identical, components and/or features, for the sake of brevity, reference numerals or features having a previously described function may not necessarily be described in connection with other drawings in which such components and/or features appear.

FIG. 4 illustrates a table including various operations in a heat source optimization system according to one or more examples of the present disclosure. As shown, the method may include a number of operations performed continuously in real-time during operation of such heat source optimization system.

Figure 1A:
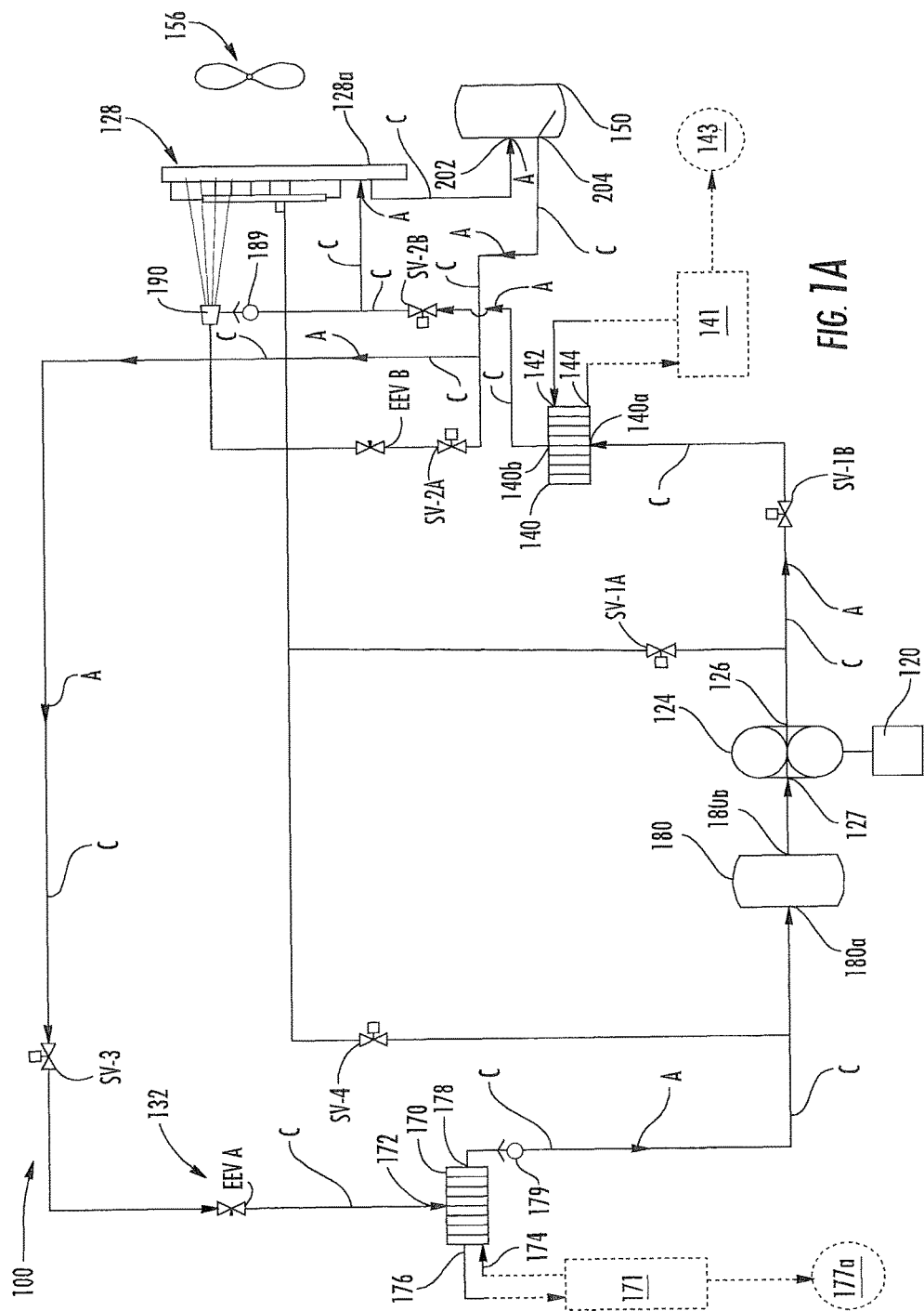
FIG. 1A is a schematic diagram of a heat source optimization system according to one or more examples of the present disclosure in a substantially simultaneous heating and cooling configuration or mode.

Each figure shown in this disclosure shows a variation of an aspect of the implementations presented, and only differences will be discussed in detail.

DESCRIPTION OF EXAMPLE IMPLEMENTATIONS

The accompanying drawings and the description which follows set forth example implementations of the present disclosure. However, it is contemplated that persons generally familiar with heat pump systems will be able to apply the novel characteristics of the structures illustrated and described herein in other contexts by modification of certain details. Accordingly, the drawings and description are not to be taken as restrictive on the scope of the present disclosure, but are to be understood as broad and general teachings.

Reference herein to "one example" means that one or more feature, structure, or characteristic described in connection with the example is included in at least one implementation. The phrase "one example" in various places in the specification may or may not be referring to the same example.

Illustrative, non-exhaustive examples, which may or may not be claimed, of the subject matter according the present disclosure are provided below.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of one or more other items, e.g., a "first" or lower-numbered item, and/or, e.g., a "third" or higher-numbered item. Further, although reference may be made herein to a number of measures, predetermined thresholds and the like such as times, distances, speeds, temperatures, flow rates, voltages, power, coefficients, pressures, humidities, percentages and the like, according to which aspects of example implementations may operate; unless stated otherwise, any or all of the measures/predetermined thresholds may be configurable. Like reference numerals refer to like elements throughout.

As used herein, "and/or" means any one or more of the items in the list joined by "and/or." Further, as used herein, the term "exemplary" means serving as a non-limiting example, instance, or illustration. Moreover, as used herein, the term, for example, or "e.g.," introduces a list of one or more non-limiting examples, instances, or illustrations.

Referring now to the figures, there are illustrated example heat source optimization systems in accordance with at least one implementation described herein. FIGS. 1A-1E illustrate an exemplary heat source optimization system, generally 100 (which may be referred to herein simply as "system 100") in accordance with aspects of the present disclosure.

In this example, the heat source optimization system 100 includes at least one motor, generally and collectively 120, drivingly connected to at least one compressor, generally and collectively 124. Compressor 124 is connected (for fluid flow, communication, or transfer, via a piping, or conduit, system, generally C) to at least one condenser device, generally and collectively 128, at least one expansion valve or device, generally and collectively 132, and at least one evaporator device, generally and collectively 136. Conduit system C connects compressor 124, condenser 128, expansion valve 132, and evaporator 136 in a loop that allows refrigerant to repeatedly cycle through system 100.

Generally, compressor 124 compresses a refrigerant or primary fluid, when such refrigerant is in the gaseous or vapor state. Such pressurized gaseous refrigerant leaves the discharge side 126 of compressor 124 in a relatively hot, highly pressurized state. Such hot gas flows through condenser 128, where the gas condenses into a relatively high pressure substantially liquid state or phase, with its temperature having been reduced somewhat. This condensed liquid refrigerant then ultimately passes through a pressure-lowering device, such as an expansion valve 132, whereby the pressure of such refrigerant is lowered, and its temperature lowered accordingly, prior to its flow into evaporator 136, wherein the refrigerant absorbs heat energy to the point that it returns to a gaseous state. The refrigerant in such gaseous state then returns to the inlet side 127 of compressor 124, and the cycle of the refrigerant through system 100 may then be repeated.

In instances where system 100 is used to heat and/or cool a space, such as a residence, swimming pool, spa, office, vehicle, vessel, commercial and/or industrial establishment or process, system 100 will in most cases ordinarily be positioned outside of such space. System 100 operates under the control of one or more processors or controllers (also hereafter referred to collectively as "controller system") (FIG. 5), in a controller system, generally 400.

Although not illustrated, control configuration 400 includes wiring or wireless connections associated or connected therewith for communicating with communication interfaces 408 having input/output circuitry for receiving sensed signals from sensors, transducers, and the like and also interface circuitry for outputting control signals for controlling the various components, including without limitation valving, motor 120, compressor 124, condenser 128, expansion valve 132, and evaporator 136, as discussed herein.

System 100 is shown in FIGS. 1A-1E in various modes of operation. In FIG. 1A, system 100 is illustrated in a configuration, or mode (FIG. 4), for permitting substantially simultaneous heating and cooling of a secondary fluid, such as water, glycol, a mixture of same, or other suitable fluid. In such mode, the refrigerant or primary fluid, exiting the discharge side 126 of compressor 124 is, as noted above by arrows A, in a pressurized, hot, gaseous state. Such refrigerant is permitted to pass through conduit system C through an open valve SV-1B (which could be connected to controller system 400 and a valve such as a solenoid valve, electric motor-controlled valve, manual valve, etc.), and then onward through a hot brazed plate, generally 140.

In passing through hot brazed plate 140, the refrigerant becomes a relatively high pressure gas of somewhat less temperature, in that it is cooled somewhat in hot brazed plate 140, and thus gives up some of its energy, to water or other secondary fluid passing through the hot brazed plate 140. The secondary fluid, which could be portable water, enters hot brazed plate 140 at inlet 142 and exits at output 144, being heated as it passes through hot brazed plate 140. From outlet 144, the heated secondary fluid could be used directly in an application calling for use of such heated secondary fluid, or, in the case of the secondary fluid being potable water, it could be used directly in an application calling for such heated potable water. Although not shown, hot brazed plate 140 could include one or more sensors for sensing flow rate, pressure, time and/or temperatures, etc. of both refrigerant and secondary fluid flowing therethrough. It is to be understood that secondary fluid passing through hot brazed plate 140 may be potable water, or may function as a fluid that goes to heat a space or for other purposes or to a secondary heat exchanger 141 which could be used to heat a space, swimming pool, spa, industrial process, etc., or to heat a potable water at a supply location, generally 143. If the secondary fluid is to be used for heating a space, swimming pool, spa, industrial process, etc., then such fluid could be water, glycol, a combination thereof, or some other suitable secondary fluid, which is preferably non-toxic, such that in the event of a leak at heat exchanger 141 or otherwise, the likelihood of such leak posing a health concern would be reduced. It should also be understood here that heat exchangers other than hot brazed plate 140 could be used if desired. It is also to be understood that secondary fluid passing through hot brazed plate 140 may be connected in parallel or in series to multiple applications where heated water is desired, such as a heat exchanger for space heating, water tanks, one or more potable hot water heater, a swimming pool, a spa, one or more commercial and/or industrial processes, a cooling tower, etc. For example, the heated secondary fluid could be used for potable hot water for so long as such hot water heater called for heat, and once that need was met, the heated secondary fluid could then be diverted to heat a swimming pool and/or spa. Alternately, such water heater and such swimming pool and/or spa could receive the heated secondary fluid simultaneously, if desired. Controller system 400 could also be configured to select the better place from which to pull heat. For example, if a heated swimming pool is available, but such heated water is not critical to have, controller system 400 could be configured to optimize the efficiency of operation of system 100 by pulling heat from such swimming pool rather than the air and/or groundwater and/or a ground loop.

Upon exiting the discharge side 140b of hot brazed plate 140, the refrigerant passes through conduit system C through an open valve SV-2B (which could be connected to controller system 400 and a valve such as a solenoid valve, electric motor-controlled valve, manual valve, etc.) to condenser 128 (and/or to a subcooler 128a thereof) and then to a liquid refrigerant receiver, generally 150, where it may be stored for future use as determined by an operator manually or automatically by controller system 400. Subcooler 128a could form a part of condenser 128 or be separate therefrom. Condenser 128 includes condenser coils (not shown) and a fan 156 which may be selectively modulated by controller system 400 to maintain the desired temperature and/or pressure of refrigerant within condenser 128. Upon leaving subcooler 158a and/or receiver 150, the refrigerant passes via conduit system C through an open valve SV-3 (which could be connected to controller system 400 and a valve such as a solenoid valve, electric motor-controlled valve, manual valve, etc.) and through expansion valve 132. Expansion valve 132 could be electrically operated so that it may be selectively modulated between the opened and closed positions under the instruction of controller system 400. It is also to be understood that expansion valve 132 could be simple fixed expansion valve or an electronic or mechanical pressure and/or temperature-actuated expansion valve, if desired.

From expansion valve 132, the refrigerant passes on to evaporator 136, and more specifically, a chilled brazed plate, generally 170. After exiting expansion valve 132, the refrigerant, now in a cooled, low pressure liquid phase, enters the inlet side 172 of chilled brazed plate 170. Chilled brazed plate 170 also includes a secondary fluid inlet 174 and outlet 176 for chilling the secondary fluid, which could be water or water mixture for cooling a space and/or for providing chilled potable water. Upon the secondary fluid entering inlet 174, it has its heat energy absorbed therefrom by the refrigerant as such secondary fluid passes through chilled brazed plate 170 such that when the secondary fluid exits outlet 176, it has experienced a temperature drop. Such secondary fluid could then go directly to a desired chilled water application (potable or otherwise), or to a secondary heat exchanger 171 for cooling a space by having an air flow pass thereby, and such air flow could be generated by a fan, a blower, or some other source (not shown). Alternately, heat exchanger 171 could exchange heat to another fluid, such as water for potable use, industrial applications, etc., generally 177a. If the secondary fluid is to be used for cooling a space, then it could be water, glycol, a combination thereof, or some other suitable secondary fluid, which is preferably non-toxic, such that in the event of a leak at heat exchanger 171 or otherwise, the likelihood of such leak in a space posing a health concern would be reduced. Similarly, if potable water is to be cooled in heat exchanger 171, then the secondary fluid flowing therethrough is preferable also potable water. It is also to be understood that secondary fluid passing through chilled brazed plate 170 may be connected in parallel or in series to multiple applications where chilled water is desired, such as a potable water cooling, space cooling, water tank cooling, cooling for one or more commercial and/or industrial processes, etc. For example, the chilled secondary fluid could be used to first cool a space for so long as such cooling was required, and once that need was met, the chilled secondary fluid could then be diverted to cool potable water, pre-cool water for an ice maker, etc. Alternately, such space and application for chilled water could receive the chilled secondary fluid simultaneously, if desired.

Although chilled brazed plate 170 serves as an evaporator, it is to be understood that other types of evaporators could be used, if desired, which could include conventional fin and tube designs, micro-channel designs, falling film evaporators, etc. The speed of fan 156 may be modulated by controlling its motor, such control, in one example, being performed via controller system 400. It is to be understood, however, that such controls could also be manually performed if desired. Generally, however, fan 156 is not required to operate when system 100 is in this mode.

Upon the refrigerant exiting the discharge side 178 of chilled brazed plate 170, the refrigerant has at this point absorbed heat from the secondary fluid and has boiled, i.e., returned to its gaseous or vaporous state, and in such state, it passes via conduit system C through check valve 179 (FIGS. 1A-1E, 2, and 3) to an inlet 180a of a suction accumulator, generally 180. When system 100 is in a heating mode, check valve 179 prevents refrigerant gas from backflowing into chilled brazed plate 170, such backflow being undesirable in that system 100 would essentially be deprived of the use of such refrigerant coming to reside in chilled brazed plate 170. Additionally, oil in system 100 could similarly back flow into chilled brazed plate 170 which could ultimately degrade performance of chilled brazed plate 170 and/or system 100. It is noted that check valve 179 could be magnetically-operated check valve, a solenoid-operated check valve, a conventional valve (such as a ball valve) that is manually and/or automatically operated to open and close, etc.

Because compressor 124 is configured to preferably compress refrigerant in its vapor state only, suction accumulator 180 serves to reduce the likelihood of damage to and/or inefficiency of compressor 124 experiencing a sudden surge of liquid refrigerant or oil, etc., that could enter compressor 124 from its suction, or inlet side 127. Thus, should the refrigerant leaving chilled brazed plate 170 have a liquid component, suction accumulator 180 serves to prevent a surge of such liquid to compressor 124, such that the refrigerant leaving suction accumulator outlet 180b is substantially in a gaseous phase.

Accordingly, as shown in FIG. 1A, system 100 is configured to simultaneously produce both hot and cold secondary fluids. Hot brazed plate 140 takes advantage of the hot, high pressure gas phase of the refrigerant as it exits compressor 124, while chilled brazed plate 170 receives the refrigerant at generally a low pressure, cooled liquid state, which absorbs heat from a secondary fluid, such as water, introduced to chilled brazed plate 170. The speed of compressor 124 is in one example modulated automatically by controller system 400 and/or manually by an operator in relation to the set point proximity temperature of the hot or cold secondary fluid at hot and chilled brazed plates 140, 170, respectively. The heated secondary fluid from hot brazed plate 140 may be used as a subsequent heat exchanger 141 for heating a space or other heating needs, and/or for heating potable water available at a supply location 143, if desired. Also, a chilled secondary fluid from chilled brazed plate 170 can be used for cooling a space using heat exchanger 171, or for other cooling needs, such as for directly cooling potable water.

It should be noted that in the implementations and examples discussed herein, controller system 400 and associated circuitry (not shown) may be connected to or otherwise receive information from signals indicating the operating state of various components of system 100 during one or more modes of operation. And further, controller system 400 through such circuitry may directly control such components. Controller system 400 may be configured to control the valves referenced herein and may also be used to control operation of motor 120, compressor 124, fan 156, pumps (not shown), and the like. As will be appreciated by those skilled in the art, system 100 in one implementation includes multiple sensors, actuators, transducers, detection devices, and/or annunciators referred to collectively herein as communication interfaces 408 (FIG. 5) (not all being shown), and may be used in association with the various components of system 100, including without limitation, motor 120, compressor 124, condenser 128, 136, expansion valve 132, accumulator 180, hot and chilled brazed plates 140, 170, respectively, and refrigerant receiver 150. Further, system 100 may include instrumentation that provides information to an operator and/or controller system 400 for monitoring the instantaneous, trend, near term and long term status of operation of system 100. Further, manual overrides and other manual controls may be provided system 100 to allow an operator to modify, suspend and/or bypass controller system 400 in order to assume partial and/or total control of operation of system 100, if desired or if necessary. For example, in system 100, temperature sensors, flow rate sensors and/or pressure sensors can be used to detect the incoming temperature, pressure, flow rates of secondary fluids into and out of hot and chilled brazed plates 140 and 170, respectively. Additionally, fluid level sensors could be provided for refrigerant receiver 150 and suction accumulator 180 and at other locations of system 100, and such information can be provided to controller system 400 and/or to an instrumentation display. Refrigerant receiver 150 and suction accumulator 180 could also include temperature, pressure, and/or flow rate sensors to monitor the refrigerant passing therethrough. Similarly, compressor 124, condenser 128, expansion valve 132, evaporator 136 (to include chilled brazed plate 170), and hot brazed plate 140 can likewise include one or more sensors for detecting incoming and outgoing refrigerant temperatures, pressures, flow rates and/or state or phase of the refrigerant.

Such sensors may be used singularly or in combination, and may be used, for example, for calculation of superheat of the refrigerant upstream of compressor 124. Additionally, temperature sensors may be used to detect ambient temperature, such as of the air surrounding and circulating through a heat exchanger, for example condenser 128 and hot and chilled brazed plates 140, 170, respectively, and also for detecting the temperature of ground water and/or the temperature of ground (earth) water loops available to system 100. Such instrumentation may be connected to controller system 400 via hardwire, wirelessly, optically, sonically, and/or through other means to provide output signals and to communicate with the control circuitry of controller system 400 in a manner to allow controller system 400 to process, manipulate, scale, and make calculations and control decisions based on such signal inputs.

It is also to be understood that controller system 400 is not limited to information and/or signals received from such instrumentation, but could also draw information from and receive inputs from other sources, and such sources could be remote and received through wire or wireless connection with the Internet or communications via other means including, but not limited to, microwave, radio frequency, Bluetooth, hardwire, electricity transmission lines, telephone, and/and other available communication modalities. For example, such remote information could include current weather and/or weather forecast information obtained from the Internet which could bear on operation of system 100. In accordance with example implementations, the one or more sensors perform one or more actions in response to conditions they sense individually and or collectively, in real-time (real-time generally herein including near real-time) during operation.

Figure 5:
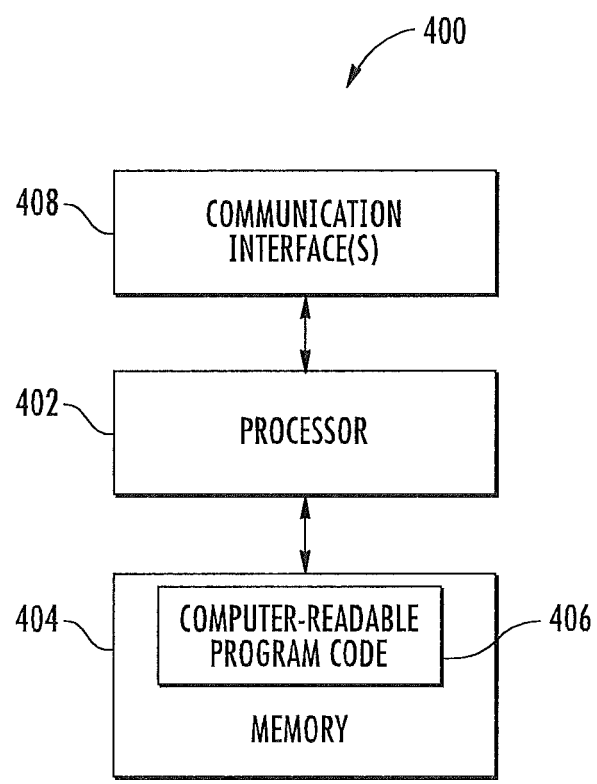
FIG. 5 illustrates an apparatus that according to some examples may be configured to at least partially implement a controller system in accordance with example implementations.

FIG. 5 illustrates a control system 400 that according to some examples may be configured to at least partially implement the operation of system 100, Generally, the apparatus of exemplary implementations of the present disclosure may comprise, include or be embodied in one or more fixed, portable or embedded electronic devices. The apparatus may include one or more of each of a number of components such as, for example, a processor 402 comprising hardware and software connected to a memory 404. For each sensor, processor 402 may receive a measurement from the sensor.

The processor 402 is generally any piece or component of computer hardware that is capable of processing information such as, for example, data, computer-readable program code, instructions or the like (at times generally referred to as "computer programs," e.g., software, firmware, etc.), and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 404 (of the same or another apparatus).

The processor 402 may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory 404 is generally any piece or component of computer hardware that is capable of storing information such as, for example, data, computer programs (e.g., computer-readable program code 406) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disc-read only memory (CD-ROM), compact disc-read/write (CD-R/W), digital versatile disc (DVD) or other standard media and format. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory 404, the processor 402 may also be connected to one or more of the communication interfaces 408 for displaying, transmitting and/or receiving information. The communications interface may be configured to transmit and/or receive information, such as to and/or from other apparatus(es), network(s) or the like. The communications interface may be configured to transmit and/or receive information by physical (wireline) and/or wireless communications links. Examples of suitable communication interfaces include a network interface controller (NIC), wireless NIC (WNIC) or the like.

As indicated above, program code instructions may be stored in memory, and executed by a processor, to implement functions of the systems, subsystems and their respective elements described herein. As will be appreciated, any suitable program code instructions may be loaded onto a computer comprising hardware and software, or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus. Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 400 may include a processor 402 and a computer-readable storage medium or memory 404 coupled to the processor, where the processor is configured to execute computer-readable program code 406 stored in the memory. It will also be understood that one or more functions, and combinations of functions, may be implemented by special purpose hardware-based computer systems and/or processors which perform the specified functions, or combinations of special purpose hardware and program code instructions.

Figure 1B:
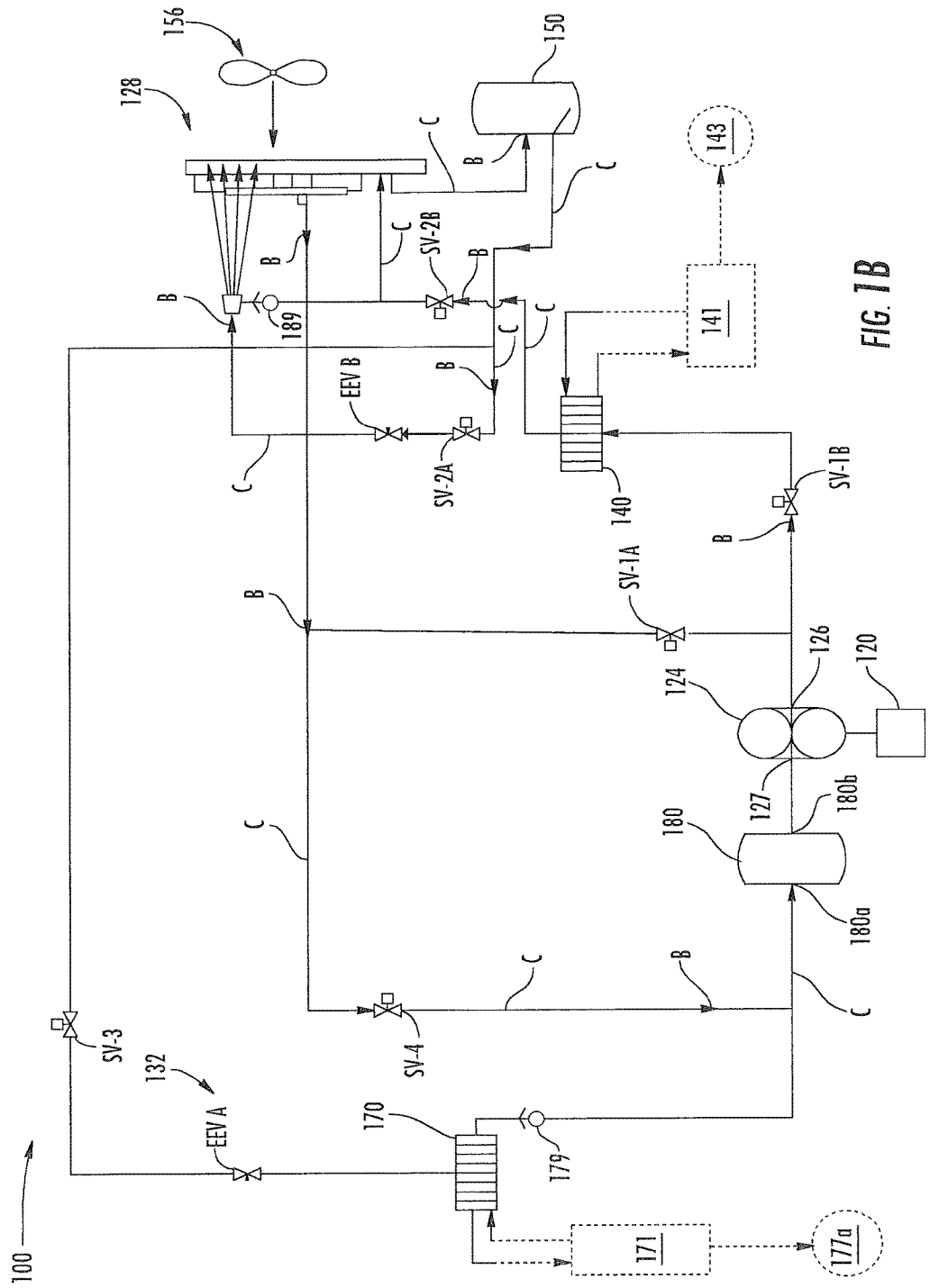
FIG. 1B is a schematic diagram of a heat source optimization system according to one or more examples of the present disclosure in a mode for producing hot water and/or a heated secondary fluid.

In FIG. 1B, one exemplary implementation of system 100 is shown in a mode (FIG. 4) configured for production of hot water. In this mode and as shown by arrows B, refrigerant passes through conduit system C from the discharge side 126 of compressor 124 through open valve SV-1B to hot brazed plate 140. The secondary fluid enters inlet 142 of brazed plate 140 and exists outlet 144, absorbing heat from hot brazed plate 140. As noted above, hot brazed plate 140 is heated by the hot pressurizes refrigerant vapor which is pressurized and which passes through hot brazed plate 140. The speed of compressor 124 is modulated automatically by controlling system 100 and/or manually based on the proximity of the output temperature of the secondary fluid from hot brazed plate 140.

The refrigerant, upon exiting hot brazed plate 140 flows via conduit system C through open valve SV-2B and on to refrigerant receiver 150, passing through subcooler 128a as it proceeds to refrigerant receiver 150. From refrigerant receiver 150 the relatively high pressure gas refrigerant passes via conduit system C through an open valve SV-2A (which could be connected to controller system 400 and a valve such as a solenoid valve, electric motor-controlled valve, manual valve, etc.) and an electronic expansion valve EEV B (which could be connected to controller system 400 and a valve such as an electronic valve, solenoid valve, electric motor-controlled valve, manual valve, etc.) through condenser 128, becoming a low pressure gas and passes through condenser 128 and absorbs heat from the ambient air, with fan 16 being modulated by controller system 400 and/or manually depending on the ambient temperature. This, in this mode, condenser 128 acts as an evaporator, wherein the refrigerant absorbs heat and gains pressure as a gas. From condenser 128, the substantially low pressure gas refrigerant flows via conduit system through open valve SV-4 (which could be connected to controller system 400 and a valve such as a solenoid valve, electric motor-controlled valve, manual valve, etc.) and then, via conduit system C, through suction accumulator 180 to the inlet side 127 of compressor 124, where the refrigerant's cycle may then be repeated. In the event neither an ambient air nor a groundwater/ground loop source provides adequate heat for extraction by system 100 to meet desired temperatures and/or demand for heated secondary fluid, system 100 can also be provided with other heat sources, such as a boiler, furnace, heat exchanger (non shown), which could be used to preheat the secondary fluid prior to entering system 100 and/or for supplementing heating of such secondary fluid upon its exiting system 100.

Figure 1C:
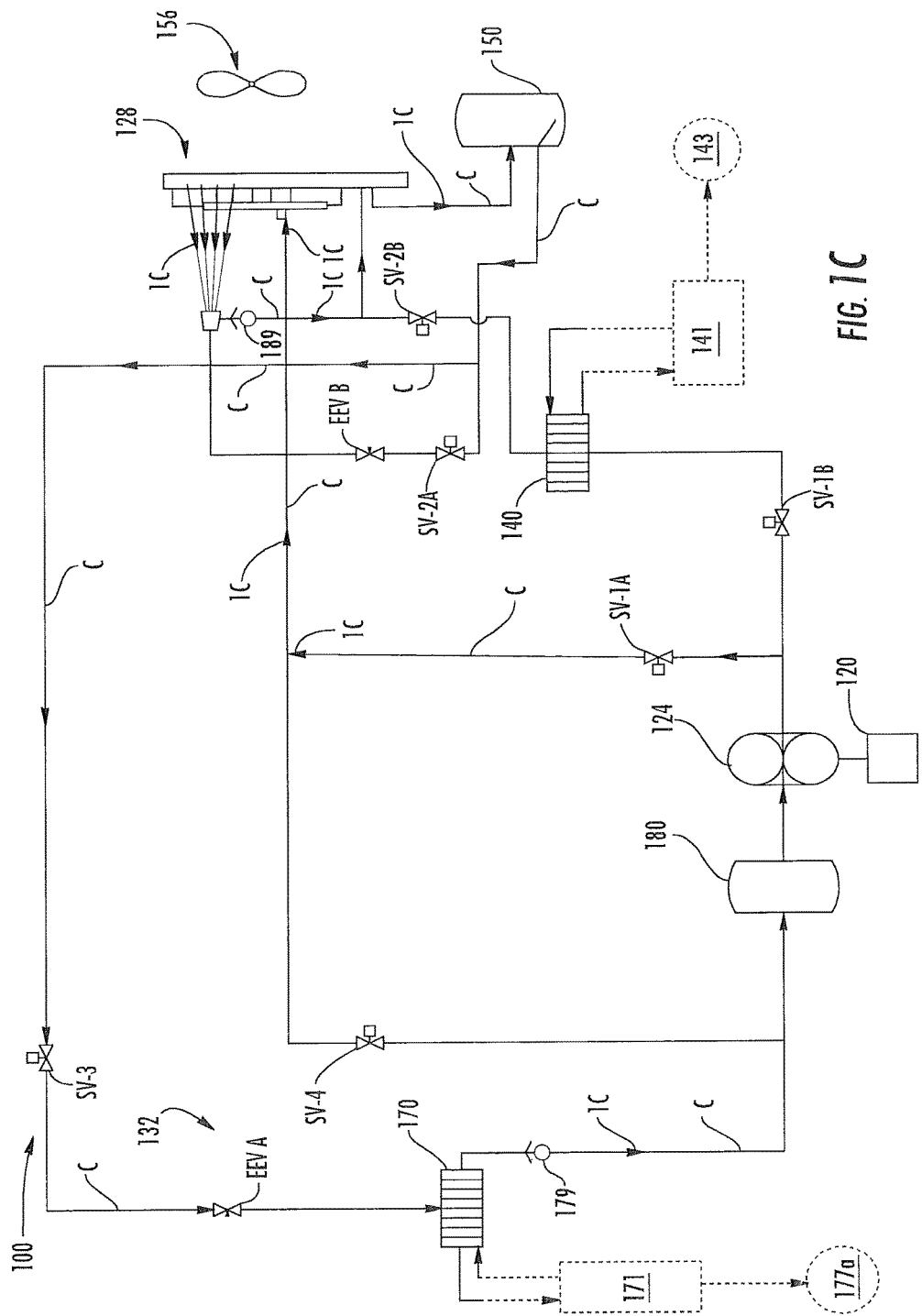
FIG. 1C is a schematic diagram of a heat source optimization system according to one or more examples of the present disclosure in a mode for producing chilled water and/or a cooled secondary fluid.

FIG. 1C illustrates one example implementation of system 100 in a substantially chilled secondary fluid-producing mode (FIG. 4). In this example as shown by arrows 1C, high pressure refrigerant gas from the outlet 126 of compressor 124 passes through open valve SV-1A (which could be connected to controller system 400 and a valve such as a solenoid valve, electric motor-controlled valve, manual valve, etc.) and then through condenser 128 and refrigerant receiver 150, which may act as a reservoir for storing refrigerant not instantaneously required by system 100. The speed of compressor 124 is modulated by controller system 400 and/or manually dependent on the temperature of the secondary fluid exiting chilled brazed plate 170. The provision of such a reservoir of refrigerant allows additional refrigerant to be selectively introduced into system 100 as needed, which may be determined by controller system 400 and/or by an operator using one or more manual controls. Refrigerant reservoir 150 also allows for refrigerant to be selectively removed from system 100 to prevent or reduce the likelihood of over-pressurization of system 100 due to an excess amount of refrigerant being in one or more locations of system 100. The speed of fan 156 may be modulated dependent on the desired pressure of refrigerant in condenser 128 and/or the ambient temperature by controlling the motor of fan 156, such control, in one example, being performable via controller system 400. It is to be understood, however, that such controls could also be manually performed if desired.

From condenser 128 and refrigerant receiver 150, the refrigerant, now substantially in liquid form, passes through an open valve SV-3 (which could be connected to controller system 400 and a valve such as a solenoid valve, electric motor-controlled valve, manual valve, etc.) and expansion valve 132 which in one implementation is, as noted above, electrically-operated and may be controlled by controller system 400. The refrigerant in a cooled low pressure gas state flows from expansion valve 132 to the inlet 172 of chilled brazed plate 170, and the secondary fluid, such as water, enters inlet 174 of chilled brazed plate 170, wherein the refrigerant absorbs heat from such water, thereby cooling such secondary fluid. The cooled secondary fluid then flows from chilled brazed plate 170 via outlet 176. As discussed above with respect to the example of FIG. 1A, this chilled secondary fluid can then be sent to heat exchanger 171 for use in cooling a space and/or may be used to cool potable water or water used for other purposes such as industrial and/or commercial uses. After passing through chilled brazed plate 170, the refrigerant, now in a substantially vapor state after absorbing heat from the secondary fluid flowing through chilled brazed plate 170, passes through via conduit system C through suction accumulator 180 and then to the inlet 127 of compressor 124.

Figure 1D:
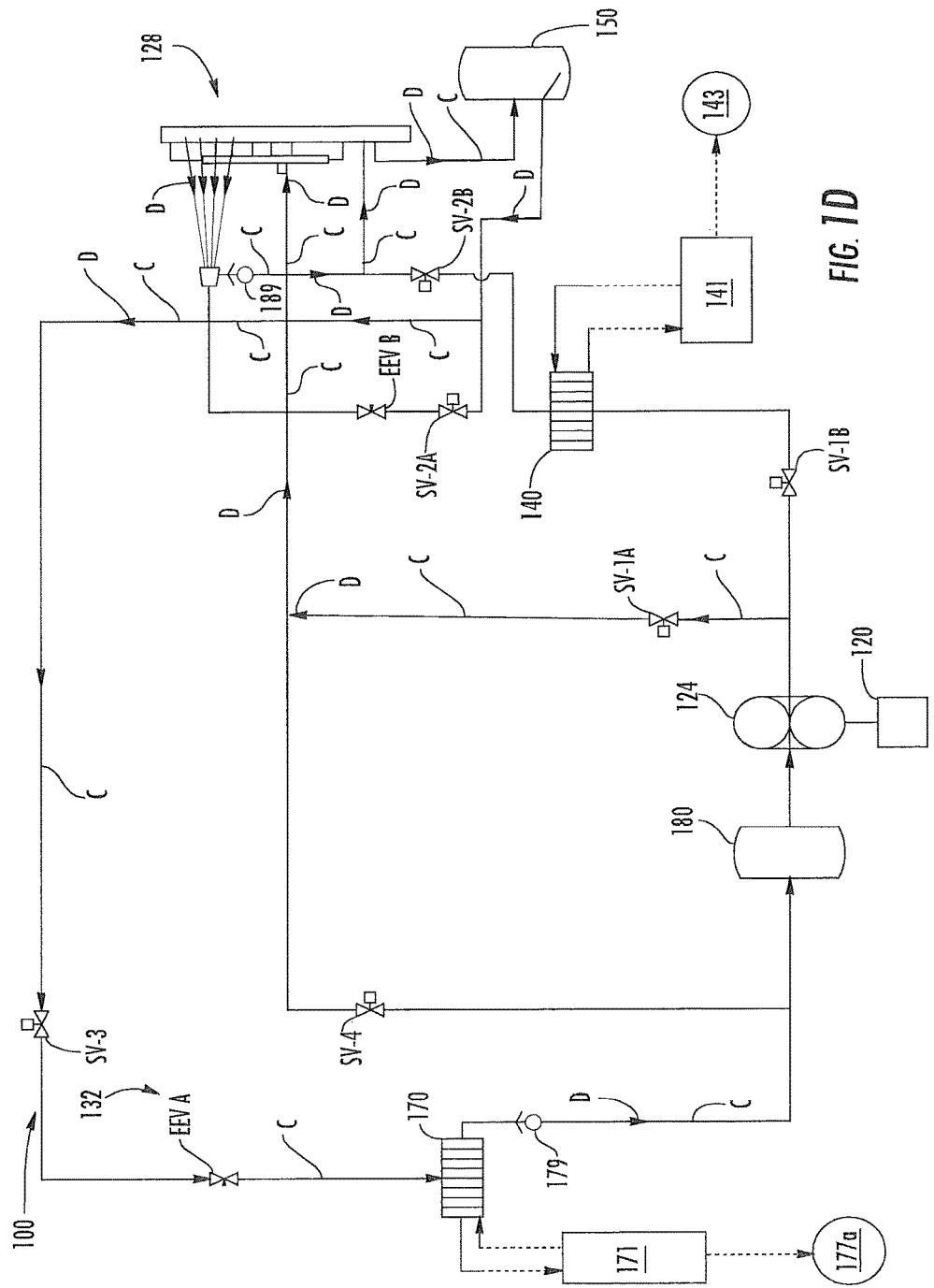
FIG. 1D is a schematic diagram of a heat source optimization system according to one or more examples of the present disclosure in a substantially defrosting mode.

FIG. 1D illustrates an example implementation of system 100 in a substantially defrost mode (FIG. 4). In this mode, and as shown by arrows D, high pressure gaseous refrigerant exits compressor 124 outlet 126 and passes through open valve SV-1A via conduit system C and then passes to condenser 128. The speed of compressor 124 is modulated automatically by controller system 400 and/or manually dependent on the calculated necessary defrost intervals, as determined by controller system 400 and/or by preset intervals. Fan 156 is typically not active during this mode of system 100. The refrigerant passes through condenser 128 and refrigerant receiver 150 via conduit system C and then passes through open valve SV-3. After passing through open valve SV-3, the refrigerant, now in a generally liquid phase, passes through an expansion valve 132, namely, expansion valve EEV A (which could be connected to controller system 400 and a valve such as an electronic valve, a solenoid valve, electric motor-controlled valve, manual valve, etc.), and then on through chilled brazed plate 170. After passing through chilled brazed plate 170, the gaseous refrigerant passes on through suction accumulator 180 and then on to the inlet 188 of compressor 124 such that the cycle may again be repeated.

Figure 1E:
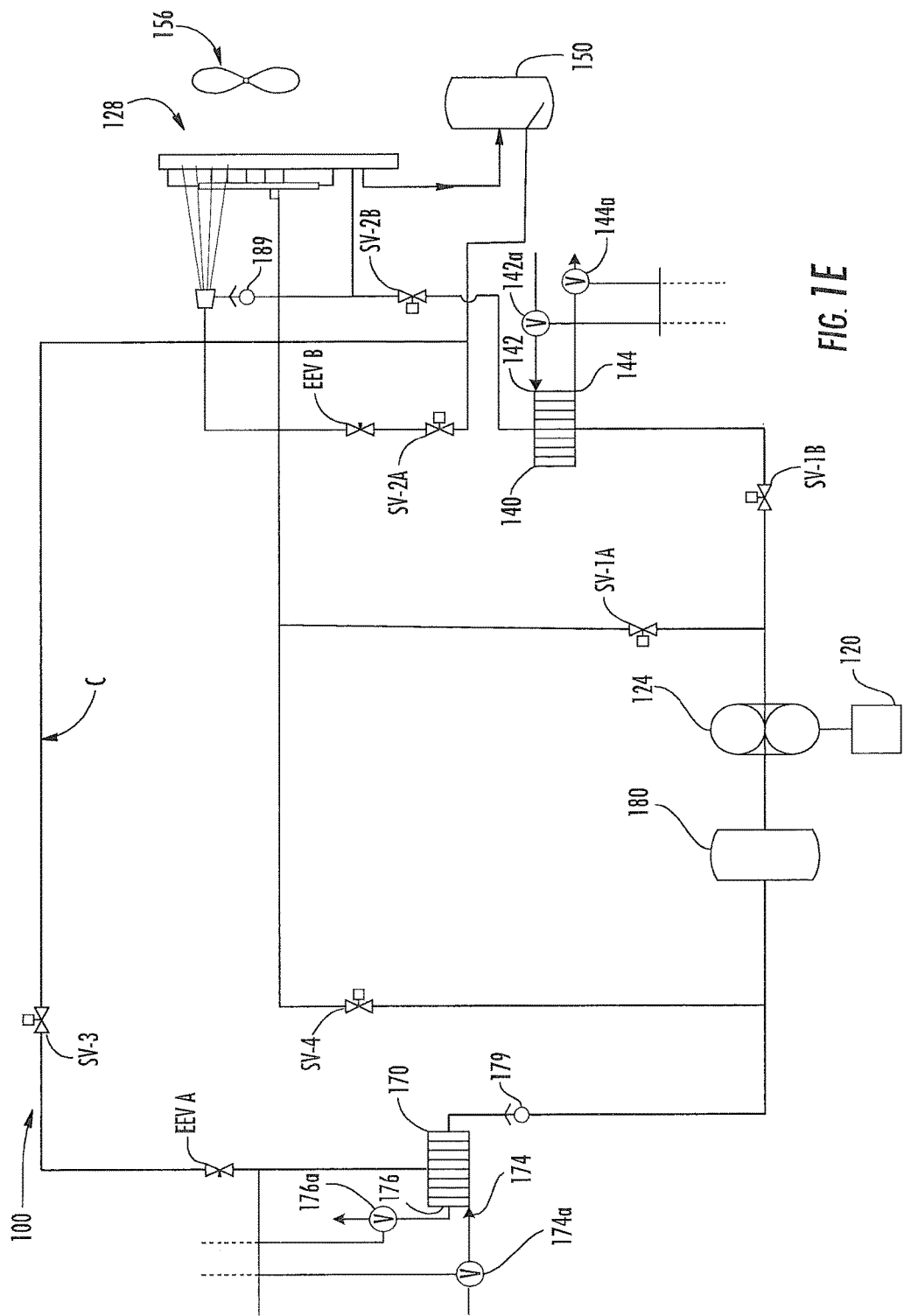
FIG. 1E is a schematic diagram of a heat source optimization system according to one or more examples of the present disclosure in a mode using groundwater and/or one or more earth (ground) loops.

FIG. 1E illustrates an example system 100 configured in a mode for use of ground water and/or one or more earth (ground) loops. Each of the modes discussed above in relation to FIGS. 1A-1D could be accomplished with the configuration of system 100 shown in FIG. 1E. Such ground water can be supplied to system 100 via a well or through a loop of pipe of conduit buried in the ground, ocean, a body of water, or other substance. The loop of pipe or conduit picks up heat from the earth, body of water, etc. or discharges heat thereto, as the case may be, depending on the operation mode of system 100. For example, in the event the inputs from system 100's sensors discussed herein, including from ambient air temperature sensors, provided to controller system 400 and/or an operator, indicate it is more beneficial to take heat from ground water or such loop, instead of to or from the air, then when system 100 is in automatic mode, controller system 400 directs the system 100, and in particular, the valving thereof, to assume a configuration for using ground water for discharging heat thereto via the ground water and/or loop, or obtaining heat from the ground water and/or loop.

If controller system 100 determines that under the then-current operating conditions of system 100 that the coefficient of performance of system 100 would be enhanced by discharging heat to groundwater and/or such loop as compared to discharging such heat to the air, then ground water and/or water or a secondary fluid form such loop is introduced through valve 142a into inlet 142 of hot brazed plate 140 and discharged via valve 144a to the ground water and/or loop, or perhaps to grade or the ground's surface via outlet 144 of hot brazed plate 140.

If controller system 100 determines that under the then-current operating conditions of system 100 that the coefficient of performance of system 100 would be enhanced by absorbing heat from groundwater and/or such loop as compared to absorbing such heat from the air, then ground water and/or water or a secondary fluid form such loop is introduced through valve 174a into inlet 174 of chilled brazed plate 170 and discharged via valve 176a to the ground water and/or loop, or perhaps to grade or the ground's surface via outlet 176 of hot chilled plate 170.

It is to be understood that if such ground water is drawn from a well, then the water exiting hot brazed plate 140 or chilled brazed plate 170 could flow to an auxiliary heat exchanger, such as auxiliary heat exchangers 141 or 171 (not shown in FIG. 1E) discussed above, for providing heated or chilled water, respectively, either for cooling of air within a space, water, or some other fluid, as desired. Additionally, a separate open loop could be used in this configuration, as also in the configurations above, to take advantage of the heating and cooling provided by such heat exchangers to heat or cool potable water or some other fluid in an open loop arrangement. Alternately, or in addition, an open loop could be provided for communicating with such auxiliary heat exchanger to provide heated potable water or other fluid. As shown in FIG. 1E, when ground water and/or loop secondary fluid/water is used, the refrigerant passing from compressor 124 passes through valve SV-1B and, via conduit hot brazed plate 140. Such refrigerant also passes through refrigerant receiver 150, but generally bypasses altogether condenser 128, and fan 156 would, consequently, typically be operational and the speed of fan 156 modulated dependent on the desired temperature and/or pressure of refrigerant in condenser 128 via controller system 400. The refrigerant then flows through SV-3 and through expansion valve 132 and on through chilled brazed plate 170, and then on through suction accumulator 180 and back and out in a gaseous phase, through the inlet 188 of compressor 124.

Figure 2:
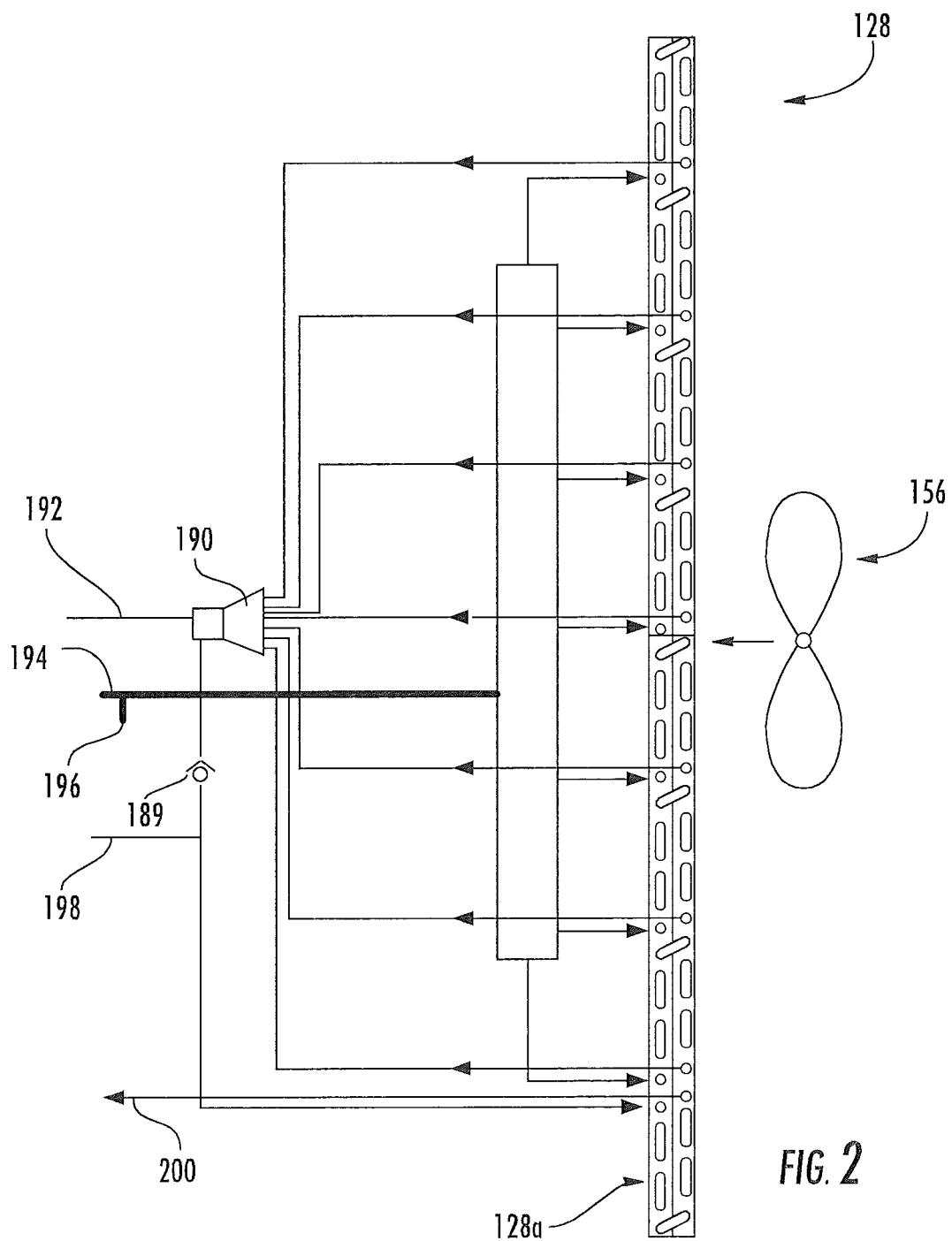
FIG. 2 is a schematic diagram of a condenser portion of a heat source optimization system according to one or more examples of the present disclosure.

FIG. 2 illustrates a more detailed view of condenser 128. Condenser 128 includes a plurality of outlet conduits which flows from a manifold, generally 190, as the refrigerant is delivered from expansion valve EEV B, such as in the case when system 100 is in the hot water producing mode as shown in FIG. 1B and discussed above. Note that prior to entering manifold 190, the refrigerant it passes via conduit system C through check valve 189. When system 100 is in a heating mode, check valve 189 prevents refrigerant gas from flowing through subcooler 128a and assists in maintaining flow of the refrigerant through condenser 128. It is noted that check valve 189 could be magnetically-operated check valve, a solenoid-operated check valve, a conventional valve (such as a ball valve) that is manually and/or automatically operated to open and close, etc.

In this manner, the refrigerant, after passing through expansion EEV B absorbs heat in condenser 128 and returns to a substantially gaseous phase prior to entering suction accumulator 180 and in turn inlet 188 of compressor 124. As shown in FIG. 2, input 192 is connected to expansion valve EEV B. Input 194 is connected to valve SV-1A, and outlet 196 is connected to valve SV-4. Inlet 198 is connected to valve SV-2B downstream of the outlet of hot brazed plate 140, and outlet 200 is connected to the inlet 202 of refrigerant receiver 150, which also includes an outlet 204.

Figure 3:
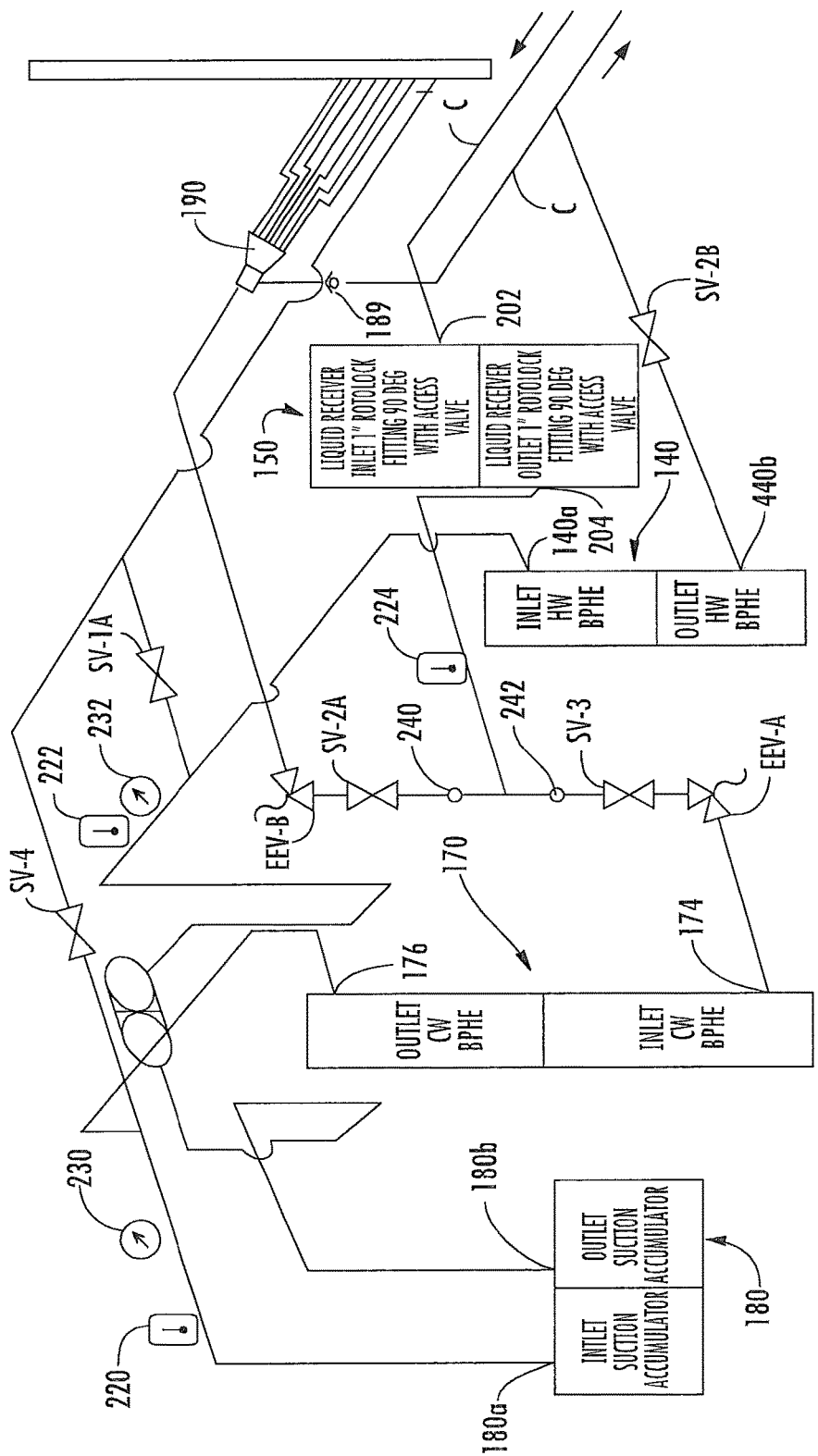
FIG. 3 is a schematic diagram of a portion of a heat source optimization system according to one or more examples of the present disclosure.

FIG. 3 illustrates schematically an example of system 100 having sensors, and more specifically, thermistors 220, 222, and 224 and pressure transducers 230 and 232. Thermistor 220 is associated with sensing the refrigerant of inlet temperature of the suction accumulator 180, and thermistor 222 is associated with sensing the discharge temperature of refrigerant from compressor 124. Thermistor 224 is associated with sensing the temperature of the outlet of refrigerant receiver 150. It is to be understood that thermistors 220, 222, and 224 may be connected through circuitry discussed above to controller system 400.

Pressure transducer 230 is associated with the inlet pressure of the refrigerant at the suction accumulator 180, and pressure transducer 232 is associated with the pressure of the refrigerant in a conduit on the discharge side of compressor 124. Sight glasses 240 and 242 may be provided for observance by an operator in the conduit leading to the inlet of the cold water brazed plate 170. As with thermistors 220, 222, and 224, transducers 230 and 232 may be in operable communication with controller system 400 and the circuitry related thereto in order for the controller system 400 to direct operation of system 100.

FIG. 4 illustrates a table including various methods and modes of operations of system 100 discussed above and the associated operational parameters for each mode, namely the simultaneous heating and cooling (SHC) mode (see FIG. 1A), the heat only mode (see FIG. 1B), the cool only mode (see FIG. 1C), and the defrost mode (see FIG. 1D). As shown, the methods and modes may include a number of operations performed continuously in real-time during operation of system 100. More specifically, FIG. 4 lists each mode of operation of system 100, and for each such mode, the status of operation of outdoor condenser 128 and outdoor fan 156, the modulation protocol of compressor 124, the status of the solenoid valves SV-1A, SV-1B, SV-2A, SV-2B, SV-3, and SV-4, the status of the expansion valves EEV A and EEV B, and the status of use of groundwater/ground loop sources.

In an example implementation of system 100, the sensors, to include the thermistors 220, 222, and 224, transducers 230 and 232, through their connection with controller system 400 allows system 100 to selectively use air or ground water/loop water (or secondary fluid) to heat water and to cool water. Due to the valving arrangements and the interconnections of conduit system C and components of system 100, reversing valves may not be required, since system 100 is configured such that refrigerant generally flows through any given conduit in use in a particular mode of operation in one direction only. This not only allows for the elimination of reversing valves, it also allows motor 120 to always rotate in the same direction, if desired. In one example implementation, motor 120 is a direct current (DC) variable speed motor and is inverter controlled, allowing it to use alternating current (AC) for its operation. Compressor 124 in an example implementation is a scroll-type compressor and can include in one implementation a scroll compressor manufactured by Copeland, Model No. ZPV0382E-2E9-XXX. Although, it is to be understood that other compressors and compressor styles, including without limitation rotary compressors, could also be used if desired.

In the example system 100, the configuration thereof discussed above (which could, of course, be modified as necessary by one of ordinary skill in the art) includes the ability, through working via controller system 400 to selectively change its mode of operation between: simultaneously heating and cooling of water; dedicated hot water production; dedicated cold water production; defrosting; and the use of ground water/ground loop secondary fluid (which may include water) in a non-disruptive manner, i.e., motor 110 may continue to run, driving compressor 124, and the valves of system 100 do not require reversing nor is the direction of refrigerant required to reverse through a particular conduit.

The amount of refrigeration in circulation in system 100 may vary at any given time, depending on the mode of operation, demand, heat source and heat sink conditions, etc. and the speed of compressor 124. An example of system 100 as disclosed herein also allows controller system 400, based on the sensor information delivered thereto, the ability to add and remove selected amounts of refrigerant from the system, such as via selective use of refrigerant receiver 150 in order to prevent system 100 from being starved of needed refrigerant, and from system 100 being over-pressurized by an excess of refrigerant. Such configuration also allows for refrigerant to be accumulated and held as needed generally on an instantaneous basis during operation of system 100 through its various modes of operation discussed above.

In an example implementation of system 100, the refrigerant is managed through operation, under the direction of controller 400, of the valves, fans, pumps (not shown), etc. discussed herein. Refrigerant management facilitates adequate refrigerant in each operational heat exchanger, to include hot brazed plate 140, chilled brazed plate 170, condenser 128, subcooler 128a, and auxiliary heat exchangers 141, 171, etc., while at the same time preventing excessive accumulation of refrigerant in any location. One or more liquid refrigerant receivers 150 and accumulators 180 may be provided in order to optimize the amount of refrigerant in circulation at any given time during operational modes. Instead of, or in addition to use of a ground loop, a dry tower, or wet cooling tower could also be used. It is to be understood that as system 100 transitions between modes of operation, the speed of compressor 124 may be modulated by controller system 400 to lessen the likelihood of thermal effects and/or pressure change/surge effects which may occur in refrigerant liquids and gases upon sudden momentum changes, e.g. fluid hammer effects, within conduit system C and other components of system 100, particularly when valves in system 100 close. System 100 may also be configured to initiate a pump down cycle in order to retrieve refrigerant that may remain in system 100, e.g., refrigerant that may remain in the chilled brazed plate 170, upon switching of modes of operation and to transfer such refrigerant to the liquid receiver 150 and/or the suction accumulator 180 for future selective use by system 100. Generally, such a pump down cycle is not required when system 100 is in its simultaneous heating and cooling mode.

EXAMPLE

In one example implementation of a heat source optimization system according to the present disclosure, which example should not be interpreted as placing limitations on other implementations of such disclosure, performance testing of such system yielded results substantially as shown below. Such performance testing was conducted in accordance with ANSI/AHRI Standard 550/590-2011 (I-P) With Addendum 1: "Performance Rating of Water-Chilling and Heat Pump Water Heating Packages using the Vapor Compression Cycle" published by The Air-Conditioning, Heating, and Refrigeration Institute, which is incorporated herein by reference.

| Unit Nameplate | | Compressor | |
|---|---|---|---|
| Manufacturer: MultiAqua | | Manufacturer: Copeland Scroll | |
| Model No.: MHRC-60-01 | | Model No.: ZPV0382E-2E9-XXX | |
| Serial No.: MHRC-60-410-G31-14-002 | | Serial: 14E1A018L | |
| Voltage: 230 | Amps: 30 | Voltage: 230 | Amps: 25.5 |
| Hertz: 60 | Phase: 1 | Hertz: 60 | Phase: 1 |
| Refrigerant: R-410a | | Charge: 19.5 LBS/Circuit | |

| COOLING PERFORMANCE TESTS | | | | |
|---|---|---|---|---|
| Test: | 100% | 75% | 50% | 25% |
| Indoor Inlet DB ° F. | 95.00 | 79.97 | 64.87 | 55.02 |
| Indoor Inlet WB ° F. | 79.20 | 68.08 | 56.70 | 48.34 |
| Inlet Water ° F. | 51.27 | 52.01 | 52.27 | 52.31 |
| Outlet Water ° F. | 43.91 | 44.06 | 44.09 | 44.00 |

-continued

| COOLING PERFORMANCE TESTS | | | | |
|---|---|---|---|---|
| Test: | 100% | 75% | 50% | 25% |
| Water Delta ° F. | 7.36 | 7.95 | 8.18 | 8.31 |
| Flow Rate GPM | 12.06 | 12.06 | 12.08 | 12.04 |
| Total Flow Gal | 205,754 | 207,210 | 209,250 | 211,385 |
| Water Pressure Drop | 6.04 | 6.07 | 6.10 | 6.13 |
| Barometer in-hg | 28.66 | 28.63 | 28.61 | 28.59 |
| Capacity Btu/h | 44,457.4 | 48,042.0 | 49,494.2 | 50,100.5 |
| Corrected Capacity Btu/h | 44,699.6 | 48,309.9 | 49,776.4 | 50,389.0 |
| Inlet Relative Humidity % | 50.86 | 55.35 | 61,37 | 62.51 |
| Voltage V | 229.6 | 229.70 | 230.80 | 229.89 |
| Current A | 19.66 | 16.82 | 17.19 | 15.40 |
| Total Power watts | 4,402.40 | 3,771.70 | 3,177.84 | 2,843.53 |
| Compressor Discharge PSIG | 367.88 | 297.94 | 237.22 | 203.01 |
| Compressor Suction PSIG | 111.79 | 107.58 | 100.55 | 96.77 |
| Discharge Temp ° F. | 116.65 | 101.57 | 85.96 | 76.16 |
| Liquid Temp ° F. | 102.40 | 86.17 | 70.01 | 59.89 |
| Suction Temp ° F. | 56.32 | 55.94 | 53.64 | 52.53 |
| Energy Efficiency Ratio, EER | 10.098 | 12.737 | 15.575 | 17.619 |
| Corrected EER | 10.224 | 12.889 | 15.778 | 17.851 |
| Calculated IPLV | | 14.75784 | | |

| HEATING PERFORMANCE TESTS | | | | |
|---|---|---|---|---|
| Test: DB/WB/Outlet | Heating | | Low Temp | |
| Water Temp | 47/43/105 | 47/43/120 | 17/15/105 | 17/15/120 |
| Indoor Inlet DB ° F. | 46.98 | 47.03 | 17.03 | 16.94 |
| Indoor Inlet WB ° F. | 42.98 | 42.98 | 15.02 | 14.99 |
| Outlet Water Hot ° F. | 105.02 | 119.56 | 104.52 | 120.78 |
| Inlet Water Hot ° F. | 95.58 | 108.85 | 97.89 | 114.12 |
| Water Delta T ° F. | 9.43 | 10.71 | 6.63 | 6.66 |
| Flow Rate GPM | 12.19 | 11.45 | 11.93 | 12.15 |
| Total Flow Gal | 218289 | 219886 | 230988 | 232712 |
| Water Pressure Drop in-hg | 32.6817 | 34.14 | -3.22 | -3.2397 |
| Barometer in-hg | 28.58 | 28.6 | 28.69 | 28.72 |
| Capacity Btu/h | 57591.2 | 61407.4 | 39610.4 | 40480.8 |
| Inlet Relative Humidity % | 73.27 | 73 | 67.72 | 68.5 |
| Voltage V | 230.9 | 231.14 | 231.6 | 230.8 |
| Current A | 26.4 | 31.11 | 24.44 | 28.22 |
| Total Power watts | 5916.24 | 6971 | 5487.84 | 6302.7 |
| Compressor Discharge PSIG | 353.79 | 437.17 | 343.66 | 431.35 |
| Compressor Suction PSIG | 65.62 | 73.36 | 40.7 | 42.96 |
| Discharge Temp ° F. | 93.69 | 83.26 | 71.12 | 82.86 |
| Liquid Temp ° F. | 87.49 | 98.21 | 81.19 | 95.38 |
| Suction Temp ° F. | 36.36 | 37.2 | 11.2 | 11.27 |
| $COP_H$ | 3.099 | 2.804 | 2.298 | 2.045 |

| WATER TO WATER PERFORMANCE TESTS | | |
|---|---|---|
| Test: Outlet Cold/Outlet Hot | 44/105 | 44/120 |
| Outlet Water Hot ° F. | 104.89 | 119.95 |
| Inlet Water Hot ° F. | 97.43 | 112.59 |
| Water Delta T ° F. | 7.46 | 7.36 |
| Inlet Water Cold ° F. | 51.8 | 51.03 |
| Outlet Water Cold ° F. | 44.49 | 44.32 |
| Flow Rate GPM | 15.09 | 15.17 |
| Total Flow Gal | 237443 | 240261 |
| Water Pressure Drop in-hg | 4.58 | 4.59 |
| Barometer in-hg | 28.76 | 28.75 |

-continued

WATER TO WATER PERFORMANCE TESTS

| Test: Outlet Cold/Outlet Hot | 44/105 | 44/120 |
|---|---|---|
| Capacity - Hot Side | 56,396.1 | 55,907.7 |
| Capacity - Cold Side | 44,087.1 | 40,354.5 |
| Inlet Relative Humidity % | 100.23 | 100.34 |
| Voltage V | 232.65 | 233.85 |
| Current A | 16.22 | 19.08 |
| Total Power watts | 3714.8 | 4383.1 |
| Compressor Discharge PSIG | 351.24 | 426.24 |
| Compressor Suction PSIG | 109.06 | 113.12 |
| Discharge Temp ° F. | 107.85 | 122 |
| Liquid Temp ° F. | 99.1 | 113.94 |
| Suction Temp ° F. | 56.15 | 56.71 |
| $COP_{HR}$ | 7.93 | 6.44 |

Accordingly, implementations of the present disclosure result in heat source optimization systems capable of heating and chilling one or more non-toxic secondary fluids, including without limitation water, with the ability to increase efficiencies by: calculating and selecting in real-time whether to use air or groundwater/ground loop sources for heat intake and/or heat absorption sinks; and/or by selectively accumulating refrigerant and moving such refrigerant within such systems in a manner to reduce the likelihood of refrigerant starvation or over pressurization from occurring in such systems. Additionally, because such systems use a non-toxic secondary fluid the risk of injury to persons in the event of a refrigerant leak is significantly reduced.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications and other implementations of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific implementations disclosed and that modifications and other implementations are intended to be included within the scope of the appended claims.

Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed:

1. A method for substantially simultaneous heating a first fluid and cooling a second fluid using a primary fluid including use of at least one of an air source and a source of fluid, the method comprising:

compressing the primary fluid into a substantially heated gaseous state that flows in a first flow direction with a compressor having at least one component rotatable in a first direction;

transferring heat from the primary fluid to the first fluid with a first heat exchanger, wherein the first fluid is heated;

substantially condensing the primary fluid from the first heat exchanger with a condenser;

expanding the primary fluid to a substantially a gaseous state with an expansion device;

transferring heat from the second fluid to the primary fluid with a second heat exchanger that receives the primary fluid output from the expansion device, wherein the second fluid is cooled;

outputting to the compressor the primary fluid from the second heat exchanger in substantially a gaseous state;

receiving at least one measurement from a first sensor, and from the measurement using at least one processor to calculate the temperature of the air source;

receiving at least one measurement from a second sensor, and from the measurement using the at least one processor to calculate the temperature of the source of fluid;

calculating, using the at least one measurement from the first sensor and at least one processor, whether it is more advantageous to supply the first heat exchanger with air from the air source or fluid from the source of fluid;

calculating, using the at least one measurement from a second sensor and at least one processor, whether it is more advantageous to supply the second heat exchanger with air from the air source or fluid from the source of fluid; and while maintaining rotation of the at least one component rotatable in a first direction in the first direction and the first flow direction of the primary fluid and using the at least one processor, automatically and in real-time activating at least one controller to supply the first heat exchanger from the calculated most advantageous of the air source and the source of fluid and to supply the second heat exchanger from the calculated most advantageous of the air source and the source of fluid.

2. The method as defined in claim 1, wherein the air source is ambient air.

3. The method as defined in claim 1, wherein the source of fluid is a ground source of fluid.

4. The method as defined in claim 1, wherein the source of fluid is groundwater.

5. The method as defined in claim 1, wherein the source of fluid is a ground loop.

6. The method of claim 1, further comprising:

calculating, using the at least one measurement from a fluid sensor and at least one processor and during real-time during operation of a system in fluid communication with the compressor, an generally instantaneous quantity of primary fluid required by the system;

calculating, using the at least one measurement from a fluid sensor and at least one processor and during real-time during operation of the system, whether to supply to the system an amount of primary fluid from a receiver;

calculating, using the at least one measurement from a fluid sensor and at least one processor and during real-time during operation of the compressor, whether to withdraw from the system an amount of primary fluid to be sent to the receiver; and automatically activating, during real-time during operation of the compressor, at least one valve to supply to the system primary fluid from the receiver or to withdraw primary fluid from the system and send the withdrawn primary fluid to the receiver.

\* \* \* \* \*